(12) United States Patent
Komatsu et al.

(10) Patent No.: US 6,425,670 B1
(45) Date of Patent: Jul. 30, 2002

(54) COLORED ANTI-FOG MIRROR

(75) Inventors: Toru Komatsu, Shimada; Masaki Kobayashi, Fujieda, both of (JP)

(73) Assignee: Murakami Corporation, Shizuoka (JP)

( * ) Notice: Subject to any disclaimer, the term of this patent is extended or adjusted under 35 U.S.C. 154(b) by 0 days.

(21) Appl. No.: 09/688,639

(22) Filed: Oct. 16, 2000

(30) Foreign Application Priority Data

Nov. 12, 1999 (JP) .............................................. 11-322333

(51) Int. Cl.$^7$ .............................. G02B 5/08; G02B 5/28; G02B 5/26; G02B 1/10; C03C 17/00
(52) U.S. Cl. ................... 359/507; 359/584; 359/585; 359/586; 359/588; 359/589; 359/603; 359/883
(58) Field of Search ................. 359/507, 512, 359/513, 514, 584, 585, 588, 883, 884, 603, 589

(56) References Cited

U.S. PATENT DOCUMENTS

| 5,179,471 | A | * | 1/1993 | Caskey et al. |
| 5,267,081 | A | * | 11/1993 | Pein |
| 5,535,056 | A | * | 7/1996 | Caskey et al. |
| 5,594,585 | A | * | 1/1997 | Komatsu |
| 5,755,867 | A | * | 5/1998 | Chikuni et al. |
| 5,854,708 | A | * | 12/1998 | Komatsu et al. |
| 6,020,987 | A | * | 2/2000 | Baumann et al. |
| 6,045,903 | A | * | 4/2000 | Seino et al. |
| 6,071,606 | A | * | 6/2000 | Yamazaki et al. |
| 6,193,378 | B1 | * | 2/2001 | Tonar et al. |

FOREIGN PATENT DOCUMENTS

| EP | 0820967 | * | 1/1998 |
| EP | 0978494 | * | 2/2000 |
| FR | 2437634 | | 4/1980 |
| JP | 10-72242 | * | 3/1998 |
| JP | 10-114546 | * | 5/1998 |
| JP | 11-140432 | * | 5/1999 |

* cited by examiner

Primary Examiner—Ricky D. Shafer
(74) Attorney, Agent, or Firm—Hedman & Costigan, P.C.

(57) ABSTRACT

A colored anti-fog mirror includes a substrate, a metal reflecting film formed on a front surface of the substrate, and a hydrophilic function layer having a hydrophilic function and containing photocatalytic substance provided on the metal reflecting film. The thickness of the hydrophilic function layer is set in such a manner that wavelength of reflected light has a peak of reflectance within a range from 400 nm to 510 nm and a mirror surface thereby exhibits a bluish color.

15 Claims, 12 Drawing Sheets

COLORED ANTI-FOG MIRROR

BACKGROUND OF THE INVENTION

This invention relates to a mirror having both an anti-fog property and a dimming property.

It is effective for improving visibility of a mirror for an automobile to improve anti-fog and dimming properties of the mirror. The anti-fog property is a property of removing a waterdrop which is deposited on the surface of a mirror. There is a mirror for an automobile imparted with such anti-fog property by applying a water-repellent treatment on the surface of the mirror thereby to facilitate removal of waterdrop. There is a mirror for an automobile imparted with such anti-fog property by the opposite way that is applying a hydrophilic treatment on the surface of the mirror thereby to spread waterdrops on the mirror in the form of a thin film.

The dimming property is a property of mitigating the glare of the sun light during the day. As a mirror for an automobile having such dimming property, there is a colored mirror (so-called blue mirror) which has a peak of reflection in the blue range (i.e., short wavelength range) and therefore has a mirror surface exhibiting a bluish color. The human spectral luminous efficacy has a peak at a wavelength of about 555 nm in a bright environment at which yellowish green color becomes clear. As the environment becomes darker, the peak of spectral luminous efficacy shifts in the direction of blue and the peak wavelength is shifted to about 505 nm. The blue mirror has a peak of reflectance within a range from 400 nm to 510 nm. Therefore, there is discrepancy between a reflected image from the blue mirror and the peak of the human spectral luminous efficacy during the day and the reflected image looks somewhat dark and the glare of the sun light thereby is mitigated. The reflected image agrees with the human spectral luminous efficacy during the night so that the reflected image looks relatively bright during the night thereby affording good visibility.

There is a prior art mirror for an automobile with improved anti-fog and dimming properties which is proposed in the applicant's copending Japanese Patent Application No. 234981/1998. The structure of this prior art mirror will be described with reference to FIG. 2. A $TiO_2$ film 4 having a high refractive index is provided on the rear surface of a transparent glass substrate 2. On the rear surface of the $TiO_2$ film 4 is provided a $SiO_2$ film 6 having a low refractive index. Further, on the rear surface of the $SiO_2$ film 6 is provided a Cr reflecting film 8 as a metal reflecting film. The thickness of the $TiO_2$ film having a high refractive index and the thickness of the $SiO_2$ film 6 having a low refractive index are so set that the mirror will exhibit a blue color owing to interference of light. On the front surface of the transparent glass substrate 2 is provided a $TiO_2$ film 10 having a photocatalytic function. Further on the front surface of the $TiO_2$ film 10 is provided a porous $SiO_2$ film 12 having a hydrophilic property.

Light incident from a mirror surface 14 exhibits blue reflected light owing to interference between the $TiO_2$ film having a high refractive index, the $SiO_2$ film having a low refractive index and the Cr reflecting film 8 which constitutes the reflecting film whereby the dimming property is afforded. Owing to the action of the porous $SiO_2$ film, waterdrops deposited on the mirror surface 14 spreads on the mirror in the form of a thin film with a contact angle of 20 degree or below whereby the anti-fog property caused by the hydrophilic property is afforded. Since the mirror for an automobile is exposed to the outside air, contaminants are deposited on the porous $SiO_2$ film 12 which is provided on the mirror surface and the contaminants reduce the hydrophilic property of the $SiO_2$ film. The contaminants deposited on the porous $SiO_2$ film 12, however, are decomposed and removed owing to the photocatalytic action of the $TiO_2$ film 10 having the photocatalytic function and the hydrophilic function of the $SiO_2$ film thereby can be maintained.

In the prior art mirror for an automobile shown in FIG. 2, the Cr reflecting film 8 is provided as a metal reflecting film on the rear surface of the substrate 2. Further, on the front surface of the substrate 2 is provided the $TiO_2$ film 10 having the photocatalytic function. $TiO_2$ inherently has a high refractive index and therefore tends to cause reflection on the surface. This surface reflection and reflection from the Cr reflecting film 9 tend to produce double images in a reflected image. This is particularly so in a mirror of a small radius of curvature and a mirror of a complex radius of curvature.

Moreover, the mirror of FIG. 2 in which the two layers of the $TiO_2$ film and the $SiO_2$ film are respectively provided on both the front and rear surfaces of the transparent glass substrate has a complex structure with resulting high cost of manufacturing.

It is, therefore, an object of the invention to provide a colored anti-fog mirror exhibiting a blue color on the mirror surface which is capable of preventing occurrence of double images with a simple structure and a low manufacturing cost.

SUMMARY OF THE INVENTION

For achieving the object of the invention, there is provided a colored anti-fog mirror comprising a substrate, a metal reflecting film formed on a front surface of the substrate, and a hydrophilic function layer having a hydrophilic function and comprising photocatalytic substance provided on the metal reflecting film, the thickness of the hydrophilic function layer being set in such a manner that wavelength of reflected light has a peak of reflectance within a range from 400 nm to 510 nm and a mirror surface thereby exhibits a bluish color.

According to the invention, owing to the hydrophilic property of the hydrophilic function layer comprising photocatalytic substance, waterdrops deposited on the mirror surface are spread to a thin film and the anti-fog property thereby can be obtained. Further, by setting the thickness of the hydrophilic function layer comprising photocatalytic substance in such a manner that wavelength of reflected light has a peak of reflectance within a range from 400 nm to 510 nm and the mirror surface thereby exhibits a bluish color by interference between reflected light from the metal reflecting film and reflected light from the surface of the hydrophilic function layer comprising photocatalytic substance, the glare of the sun light during the day can be mitigated and excellent visibility can be obtained during the night. Further, when contaminants are deposited on the mirror surface with the result that the hydrophilic function is reduced, the contaminants are decomposed owing to the photocatalytic function of the hydrophilic function layer comprising the photocatalytic substance whereby the hydrophilic function can be restored. Further, since the distance between the metal reflecting layer and the mirror surface which causes double images is so short that occurrence of double images which can be recognized with human eyes can be prevented. Again, by causing the layer for producing interference of light to function also as the layer performing hydrophilic and photocatalytic functions, the process of manufacture can be simplified and the manufacturing cost can be reduced. In the prior art structure in which the reflecting film is provided on the rear surface of the substrate, provision of a hydrophilic function layer on the front surface of the substrate and adjustment of thickness of the layer do not contribute significantly to spectral reflectance. By only providing a hydrophilic function layer on the front surface of a substrate in the structure in which the reflecting film is provided on the front surface of the substrate and adjusting the thickness of the layer as in the present invention, color can be imparted to reflected light from the reflecting film.

The hydrophilic function layer may be made of a laminate of a photocatalytic layer comprising a photocatalytic substance and a hydrophilic layer comprising a hydrophilic substance provided on the photocatalytic layer.

According to this arrangement, the anti-fog property can be obtained by the provision of the hydrophilic layer comprising the hydrophilic substance and waterdrops deposited on the mirror surface are spread to a thin film and excellent visibility can thereby be obtained. When contaminants are deposited on the mirror surface with resulting reduction of the hydrophilic function, the contaminants are decomposed owing to the photocatalytic function of the photocatalytic layer comprising the photocatalytic substance whereby the hydrophilic function is restored.

A reflectance adjusting layer which is made of substance having a lower refractive index than the photocatalytic layer may be provided between the metal reflecting film and the photocatalytic layer.

According to this arrangement, by setting the thickness of the reflectance adjusting layer at a proper value, reduction in reflectance caused by producing reflected light of bluish color which is of a low spectral luminous efficacy can be compensated and excessive reduction in reflectance of the mirror thereby can be prevented.

The thickness of the hydrophilic layer may be selected within a range from 10 nm to 50 nm. By selecting the thickness within this range, performance of the photocatalytic function of the photocatalytic layer comprising the photocatalytic substance on the surface of the hydrophilic layer comprising the hydrophilic substance can be facilitated.

The hydrophilic function layer may be made of a layer comprising photocatalytic substance having a hydrophilic property.

A reflectance adjusting layer which is made of substance having a lower refractive index than the layer comprising photocatalytic substance having a hydrophilic property may be provided between the metal reflecting film and the layer comprising photocatalytic substance having a hydrophilic property.

The hydrophilic function layer may be made of a layer comprising a mixture of photocatalytic substance and hydrophilic substance.

A reflectance adjusting layer which is made of substance having a lower refractive index than the layer comprising a mixture of photocatalytic substance and hydrophilic substance may be provided between the metal reflecting film and the layer comprising a mixture of photocatalytic substance and hydrophilic substance.

The hydrophilic substance may for example be made of a hydrophilic inorganic oxide such as $SiO_2$. Since $SiO_2$ inherently has a hydrophilic property, the hydrophilic function can be obtained by employing $SiO_2$. The structure comprising the hydrophilic layer comprising the hydrophilic substance on the outermost surface has excellent resistance to scratches which protects the photocatalytic layer comprising the photocatalytic substance.

In a case where the metal reflecting film is made of Cr, the reflectance adjusting layer may be made of $Al_2O_3$, $ZrO_2$ or $SnO_2$. When Cr is employed for the metal reflecting film and the peak of reflectance is provided within the range from 400 nm to 510 nm, this arrangement is effective for securing proper reflectance (40%) as a mirror for an automobile. More specifically, by inserting the reflectance adjusting layer to enlarge difference in refractive index between the adjacent layers, reflectance can be increased in the entire visible light region and excessive reduction in reflectance can thereby be prevented.

The photocatalytic substance may be made of, for example, $TiO_2$. Since $TiO_2$ has a high photocatalytic function, an excellent contaminant decomposing function can be obtained. Since, further, $TiO_2$ has the hydrophilic property in itself, the anti-fog property can also be obtained, if it is arranged at a proper location.

The surface of the hydrophilic function layer may be made porous. By this arrangement, a hydrophilic function of a higher degree can be provided.

Embodiments of the invention will be described below with reference to the accompanying drawings.

DESCRIPTION OF THE PREFERRED EMBODIMENTS

Embodiment 1

Figure 1:
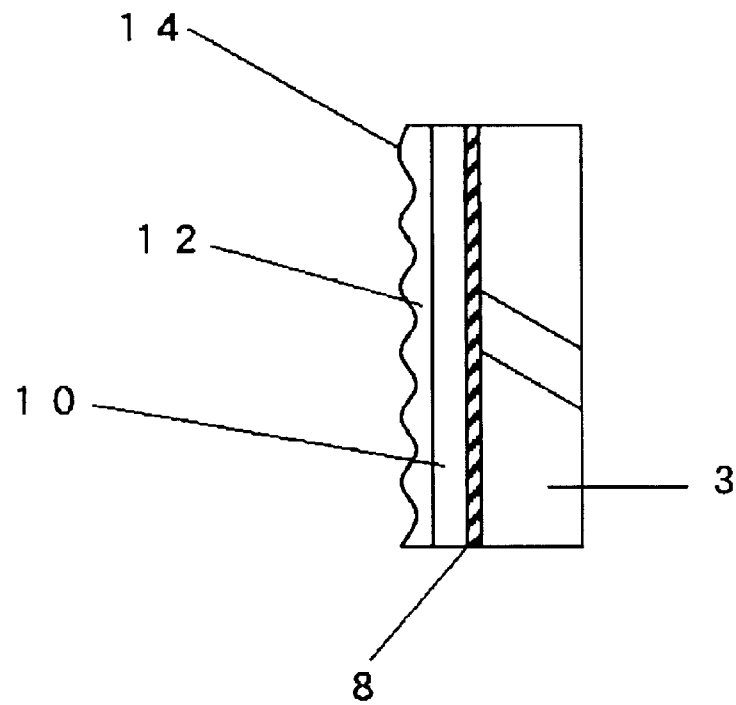
FIG. 1 sectional view showing Embodiment 1 of the invention.

FIG. 1 shows Embodiment 1 of the colored anti-fog mirror made according to the invention. On the front surface of a substrate 3 is provided a Cr reflecting film 8. On the front surface of the Cr reflecting film 8 is provided a $TiO_2$ film 10 consisting of photocatalytic substance which constitutes the photocatalytic layer comprising photocatalytic substance. On the front surface of the $TiO_2$ film 10 is provided a porous $SiO_2$ film 12 which is formed by, e.g., vapor deposition and constitutes the hydrophilic layer comprising hydrophilic substance. A hydrophilic function layer comprising photocatalytic substance is formed by the $TiO_2$ film 10 and the porous $SiO_2$ film 12. Porosity of the porous $SiO_2$ film 12 is provided by the shape and size which will not affect interference by light. The thickness of the porous $SiO_2$ film 12 is so set that the photocatalytic function by the $TiO_2$ film 10 can sufficiently reach mirror surface 14, e.g., thickness of 10 nm to 50 nm.

Figure 3:
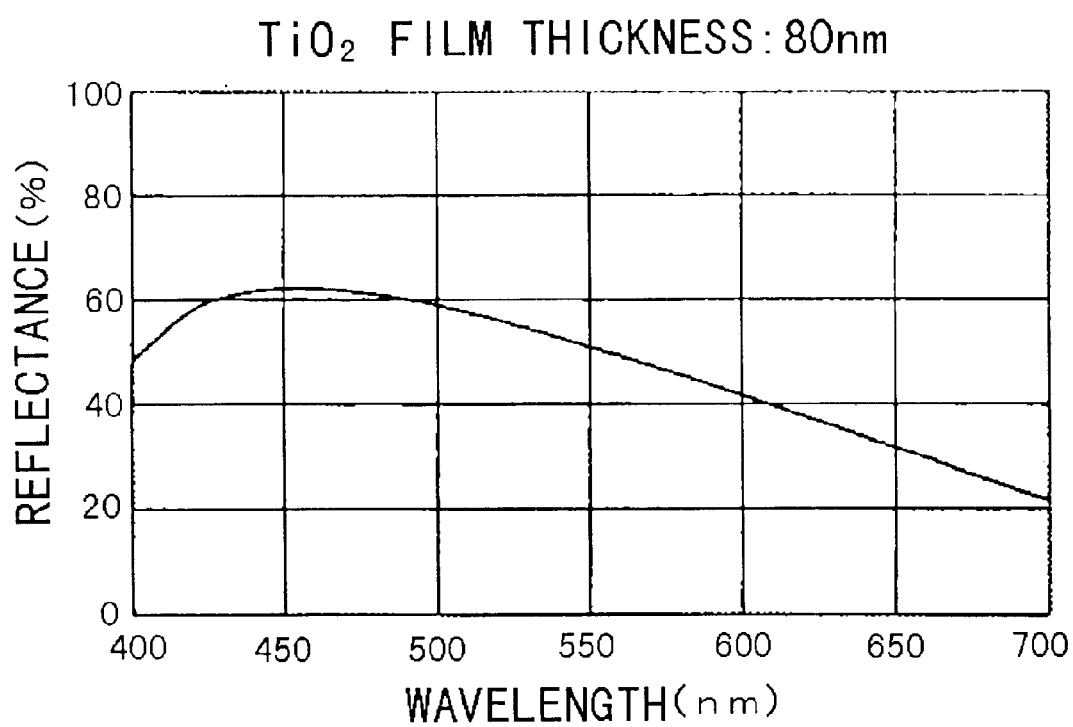
FIG. 3 a is graph showing reflectance in a case where the thickness of the photocatalytic layer of the embodiment of FIG. 1 is 80 nm.

In the mirror of FIG. 1, the color of reflected light is determined mainly by the thickness of the $TiO_2$ film 10. Reflectance available when the thickness of the $TiO_2$ film 10 is set at 80 nm and the thickness of the porous $SiO_2$ film 12 is set at 20 nm is shown in FIG. 3. According to FIG. 3, the peak of reflectance appears in the vicinity of 450 nm whereby the mirror surface exhibits blue color. The blue mirror surface 14 prevents the glare of the sun light during the day and provides excellent visibility during the night. Owing to the hydrophilic property of the porous $SiO_2$ film 12, waterdrops deposited on the mirror surface 14 are spread to a thin film whereby the anti-fog property can be obtained. Since the mirror for an automobile is exposed to the outside air, contaminants are deposited on the porous $SiO_2$ film 12 with resulting reduction in the hydrophilic property. The contaminants deposited on the porous $SiO_2$ film, however, are decomposed and removed by the photocatalytic action of the $TiO_2$ film 10 having the photocatalytic function and, therefore, the hydrophilic function is not deteriorated. The distance between the Cr reflecting film 8 and the mirror surface 14 which causes double images is sufficiently short so that double images which can be recognized by the human eyes can be prevented.

Figure 4A:
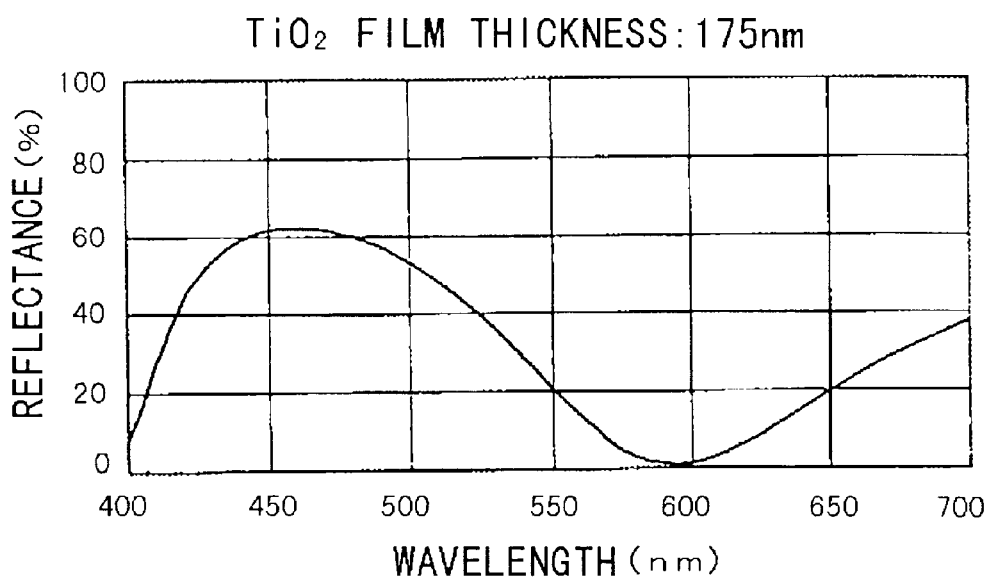
FIG. 4A is graph showing reflectance in a case where the thickness of the photocatalytic layer of the embodiment of FIG. 1 is 175 nm.
Figure 4B:
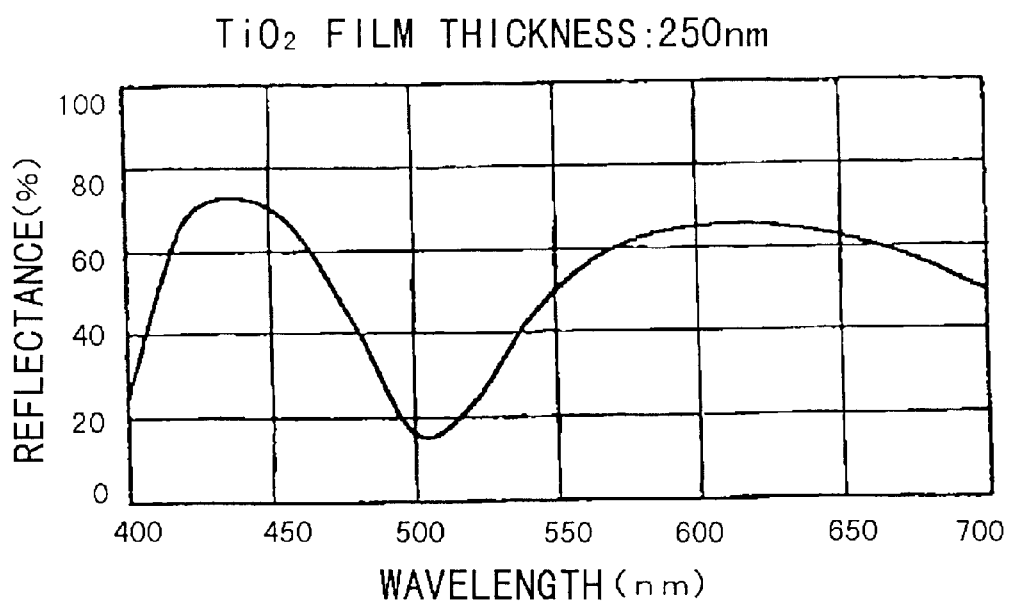
FIG. 4B is a graph showing reflectance in a case where the thickness of the photocatalytic layer of the embodiment of FIG. 1 is 250 nm.

FIG. 4A shows reflectance in a case where the thickness of the $TiO_2$ film 10 of the Embodiment 1 is set at 175 nm and FIG. 4B shows reflectance in a case where the thickness of the $TiO_2$ film 10 of Embodiment 1 is set at 250 nm. According to these figures, the peak of reflectance appears in the vicinity of 430 nm to 460 nm whereby the color of reflected light is blue, providing the function of the colored anti-fog mirror of the invention. However, as the thickness of the $TiO_2$ film 10 increases, the number of peaks of reflectance in the visible light region increases. For this reason, although the reflected light on the mirror surface 14 has a peak within the range from 400 nm to 510 nm and maintains bluish color, it exhibits a tone color in which other colors are superposed on the bluish color and the tone color changes depending upon the angle of viewing. Particularly in a mirror having a small radius of curvature such as a complex curvature mirror, a tone color error takes place. Therefore, for preventing such tone color error, the thickness of the $TiO_2$ film 10 should preferably be set at 10 nm or below so that reflectance has a single peak in the visible light region.

Figure 2:
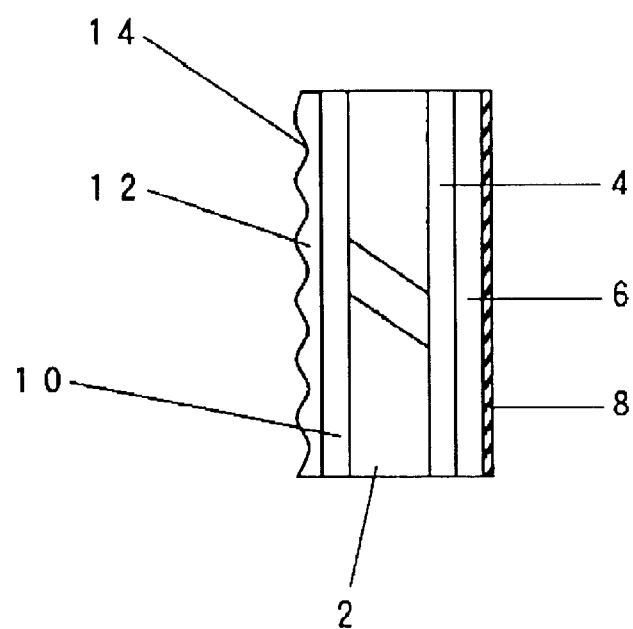
FIG. 2 is sectional view showing a prior art colored anti-fog mirror.
Figure 5A:
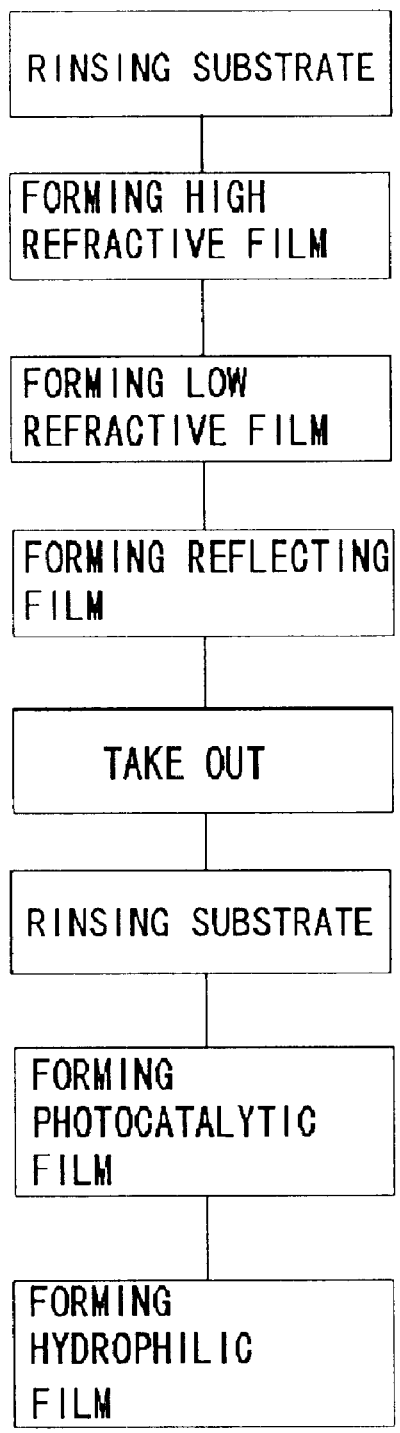
FIG. 5A is a flow chart showing an example of process for manufacturing the prior art structure.
Figure 5B:
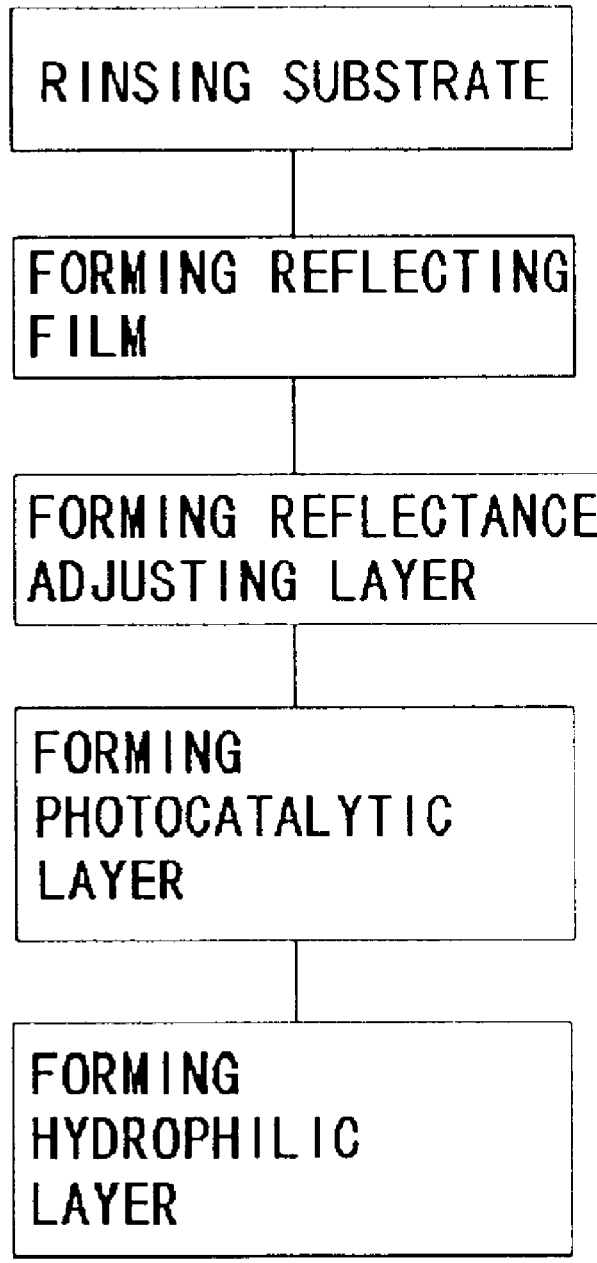
FIG. 5B is a flow chart showing an example of process for manufacturing the embodiment of FIG. 1.

FIG. 5A shows the prior art process for manufacturing the structure of FIG. 2 and FIG. 5B shows the process for manufacturing the structure of FIG. 1 (though in the structure of FIG. 1, the third process of reflectance adjusting layer is unnecessary). According to the structure of FIG. 1, all films are formed on the front side of the substrate and, therefore, a single film forming apparatus will suffice for continuously forming all films in case the films are formed by vapor deposition. Thus, the process for manufacturing can be simplified and the manufacturing cost can be reduced. Moreover, since the number of layers is relatively small, variation in the tone color due to irregularity in the thickness of films is small with the result that a product of a stable tone color can be produced.

Figure 6A:
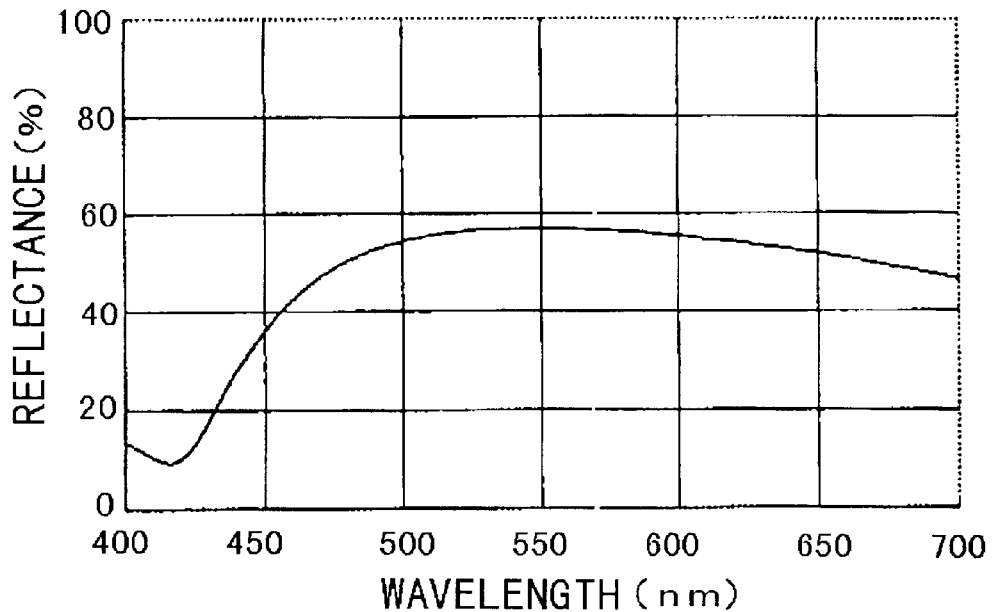
FIG. 6A is a graph showing reflectance in a case where the thickness of the photocatalytic layer of the embodiment of FIG. 1 is 105 nm.
Figure 6B:
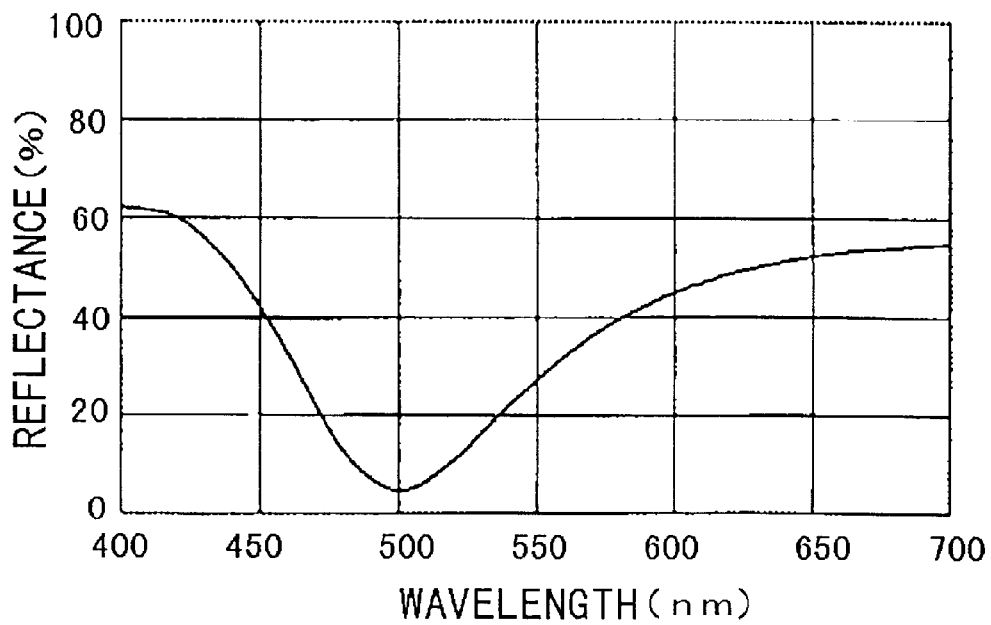
FIG. 6B a graph showing reflectance in a case where the thickness of the photocatalytic layer of the embodiment of FIG. 1 is 140 nm.

In a case where the thickness of the $TiO_2$ film 10 of the Embodiment 1 is set at 105 nm, the peak of reflectance appears in the vicinity of 550 nm as shown in FIG. 6A and the mirror surface 14 appears green. In a case where the thickness of the $TiO_2$ film 10 of the Embodiment 1 is set at 140 nm, the peak of reflectance is divided as shown in FIG. 6B and the mirror surface 14 appears purple.

Table 1 shows results of measuring the contact angle with water on the mirror surface 14 of a rear view mirror of an automobile used outside in a case where several different thicknesses were set for the $TiO_2$ film 10 of the prior art structure of FIG. 2 and the $TiO_2$ film 10 of FIG. 1 and the contact angle with water was measured at an initial stage and six months later (the automobile was cleaned with wax once per month).

TABLE 1

| Thickness of photo-catalytic | Prior art | | Present invention | |
|---|---|---|---|---|
| $TiO_2$ film | Initial | 6 months later | Initial | 6 months later |
| 50 nm | — | — | 5° or below | — |
| 75 nm | 5° or below | 30–40° | ↑ | 10° or below |
| 100 nm | ↑ | 20° or below | ↑ | ↑ |
| 150 nm | ↑ | 10° or below | ↑ | ↑ |
| 200 nm | ↑ | ↑ | ↑ | ↑ |

It is understood that in the mirror having the structure of FIG. 1, the self-cleaning function is sufficiently performed notwithstanding that the thickness of the photocatalytic $TiO_2$ film is small. Although detailed mechanism is not known, it is assumed that, according to the structure of FIG. 1 of the present invention, since the reflecting film is provided on the rear surface of the photocatalytic layer, absorption of ultraviolet ray by the substrate which take place in the structure of FIG. 2 does not take place but ultraviolet ray which is reflected by the reflecting film is incident again to the photocatalytic layer and this increases probability of contributing to the photocatalytic reaction.

Figure 7:
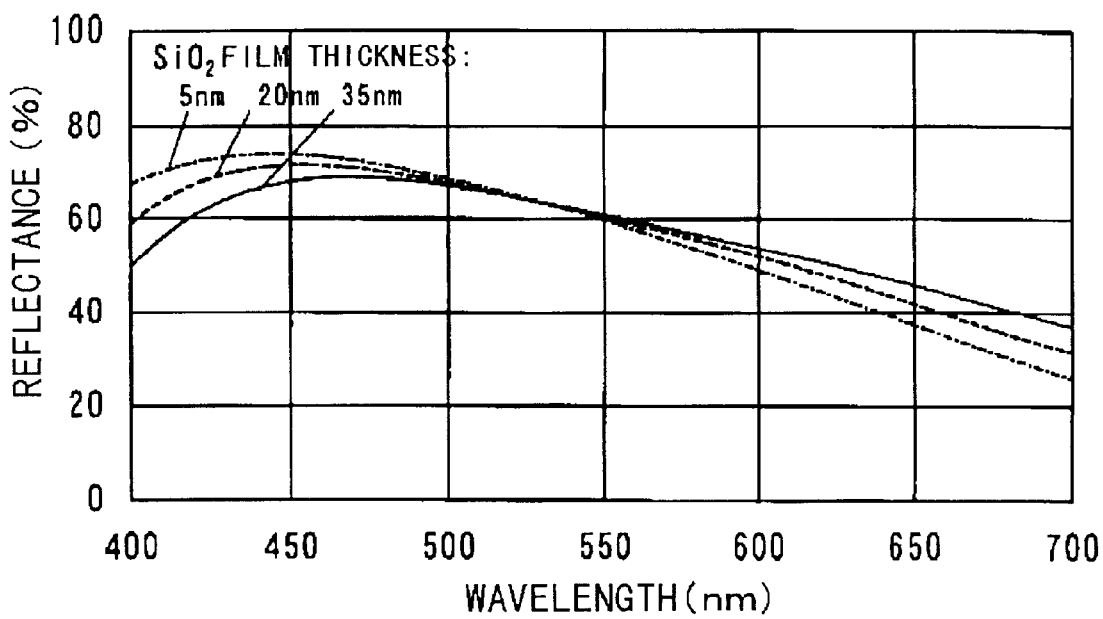
FIG. 7 is a graph showing change in reflectance with change in the thickness of the hydrophilic layer of the embodiment of FIG. 1.

Table 2 and FIG. 7 show change in reflectance caused by the thickness of the porous $SiO_2$ film 12 in the structure of FIG. 1. According to the table and figure, neither the peak wavelength nor the peak reflectance undergoes a large change with change in the thickness of the $SiO_2$ film.

TABLE 2

| $SiO_2$ film thickness (nm) | 5 | 20 | 35 |
|---|---|---|---|
| Peak wavelength (nm) | 446 | 456 | 471 |
| Peak reflectance (%) | 74 | 72 | 69 |

Embodiment 2

The Cr reflecting film has excellent anti-corrosion property and sufficient hardness but its reflectance is lower than an aluminum film. In the Embodiment 2 to be described below, therefore, a reflectance adjusting layer 20 is provided to increase reflectance.

Figure 8:
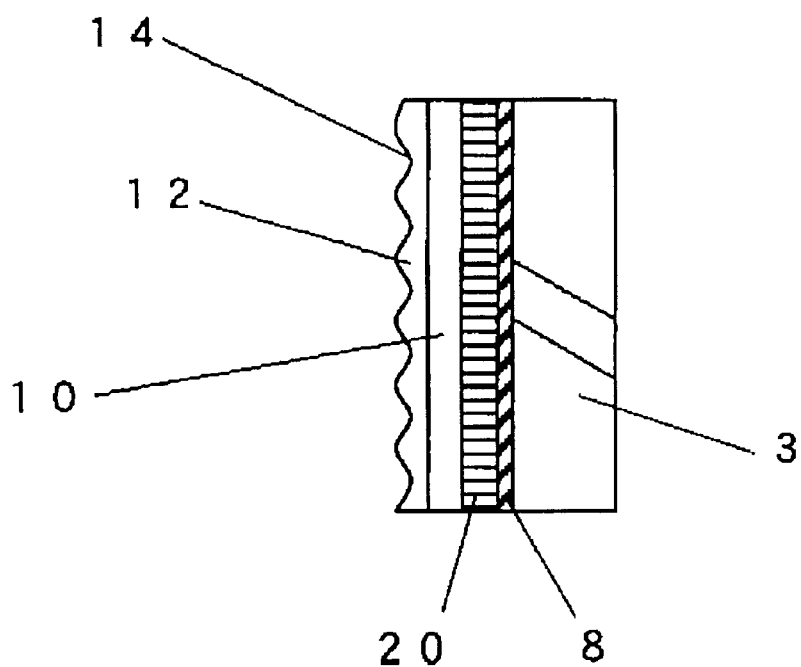
FIG. 8 sectional view showing Embodiment 2 of the invention.

FIG. 8 is a sectional view showing the Embodiment 2 of the colored anti-fog mirror made according to the invention. On the front surface of a substrate 3 is provided a Cr reflecting film 8. On the front surface of the Cr reflecting film 8 is provided a reflectance adjusting layer 20. On the front surface of the reflectance adjusting layer 20 is provided a $TiO_2$ film 10. On the front surface of the $TiO_2$ film 10 is provided a porous $SiO_2$ film 12 which is formed by, e.g., vapor deposition. The thickness of the $TiO_2$ film 10 and the porous $SiO_2$ film 12 can be set in the same manner as in the Embodiment 1 and the anti-fog property owing to the hydrophilic function of the porous $SiO_2$ film 12 and the photocatalytic action by the $TiO_2$ film 10 can be provided in the same manner as in the Embodiment 1. The reflectance adjusting layer 20 is formed of a material including, e.g., $Al_2O_3$, $ZrO_2$, $SnO_2$, $SiO_2$ or $MgF_2$ which has a lower refractive index than $TiO_2$.

Reflectance R at the border of two substances is expressed by the following formula $$R = \left[\frac{n_a - n_b}{n_a + n_b}\right]^2$$

where $n_a$ represents refractive index of substance on the incident side and $n_b$ represents refractive index of substance on the exit side.

It will be understood that the greater the difference between $n_a$ and $n_b$ is, the higher is reflectance R. Therefore, by interposing substance having a smaller refractive index than $TiO_2$ (refractive index: 2.35) between the reflecting film and the photocatalytic layer, a relatively large reflection can be obtained at the border between the reflectance adjusting layer and the photocatalytic layer whereby reflectance as a whole can be increased.

FIGS. 9 to 13 illustrate reflectance produced in cases various substances are used for the reflectance adjusting layer 20. As for thickness of films other than the reflectance adjusting layer 20, the thickness of the $TiO_2$ film 10 is 65 nm and the thickness of the porous $SiO_2$ film 12 is 20 nm.

Figure 9A:
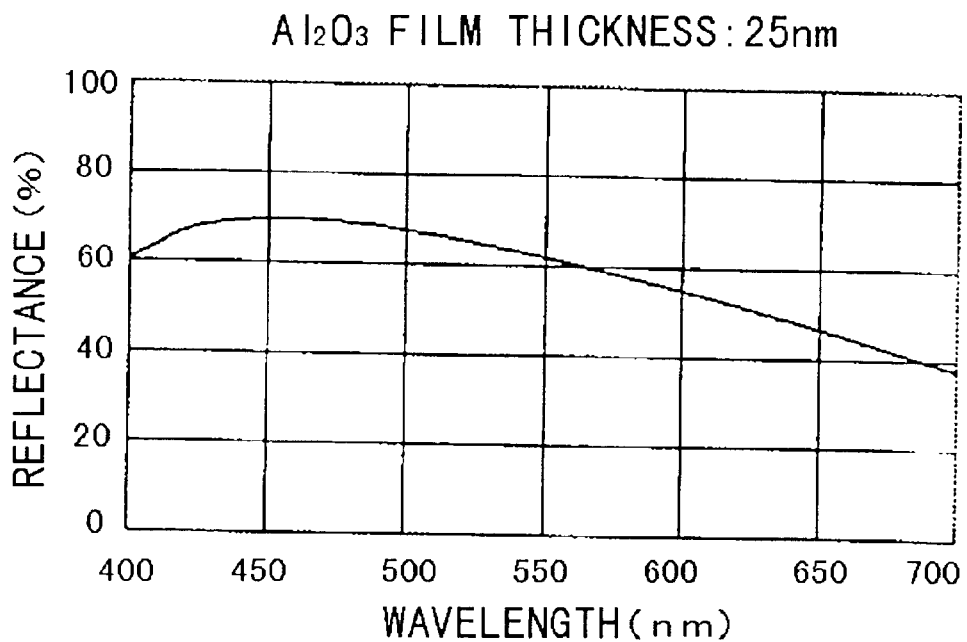
FIG. 9A is a graph showing reflectance in a case where $Al_2O_3$ is employed as the reflectance adjusting layer of the embodiment of FIG. 8 (thickness of the layer: 25 nm)
Figure 9B:
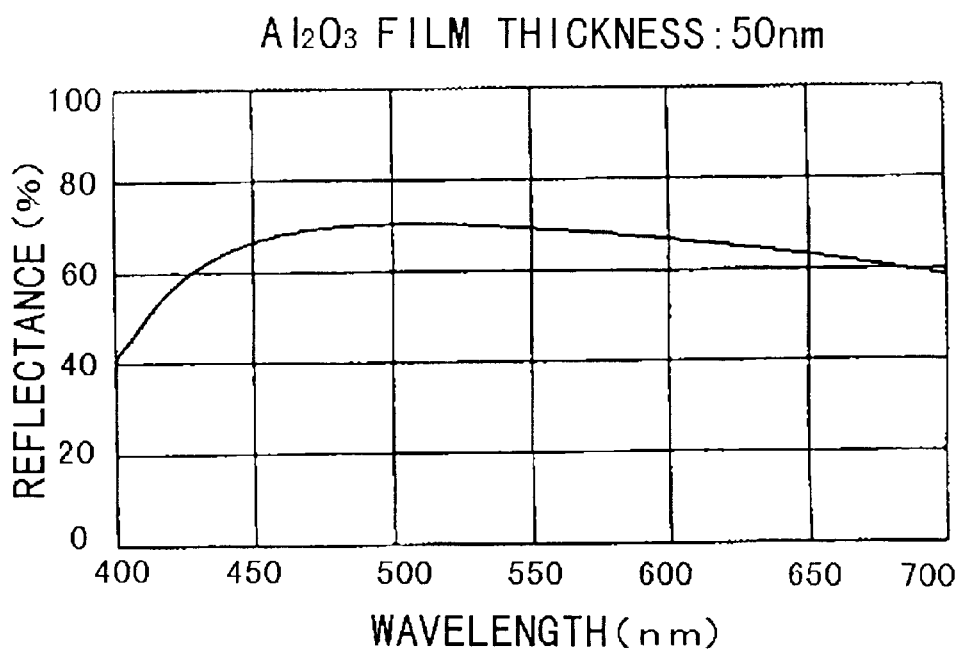
FIG. 9B is a graph showing reflectance in a case where $Al_2O_3$ is employed as the reflectance adjusting layer of the embodiment of FIG. 8 (thickness of the layer: 50 nm)

FIGS. 9A and 9B show reflectance at the film thickness of 25 nm and 50 nm in case $Al_2O_3$ is employed as the reflectance adjusting layer 20. In comparison with FIG. 3, reflectance as a whole is increased in FIGS. 9A and 9B.

Figure 10:
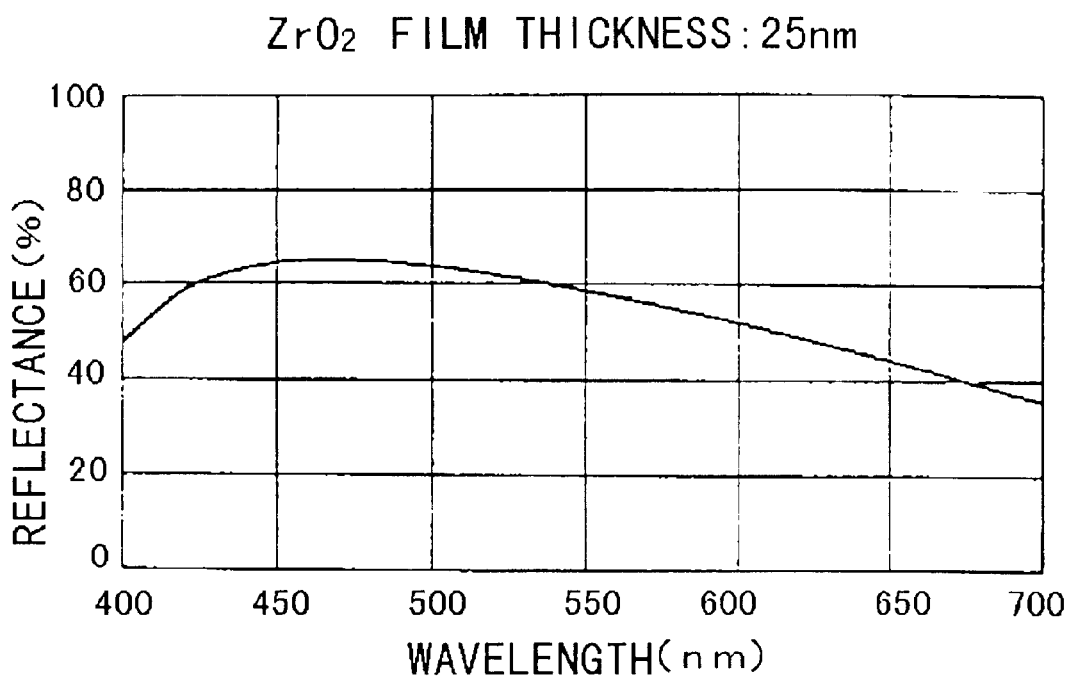
FIG. 10 is a graph showing reflectance in a case where $ZrO_2$ is employed as the reflectance adjusting layer of the embodiment of FIG. 8.

FIG. 10 shows reflectance in case $ZrO_2$ having a film thickness of 25 nm is used as the reflectance adjusting layer 20. According to this reflectance adjusting layer, reflectance as a whole is increased as compared with FIG. 3.

Figure 11:
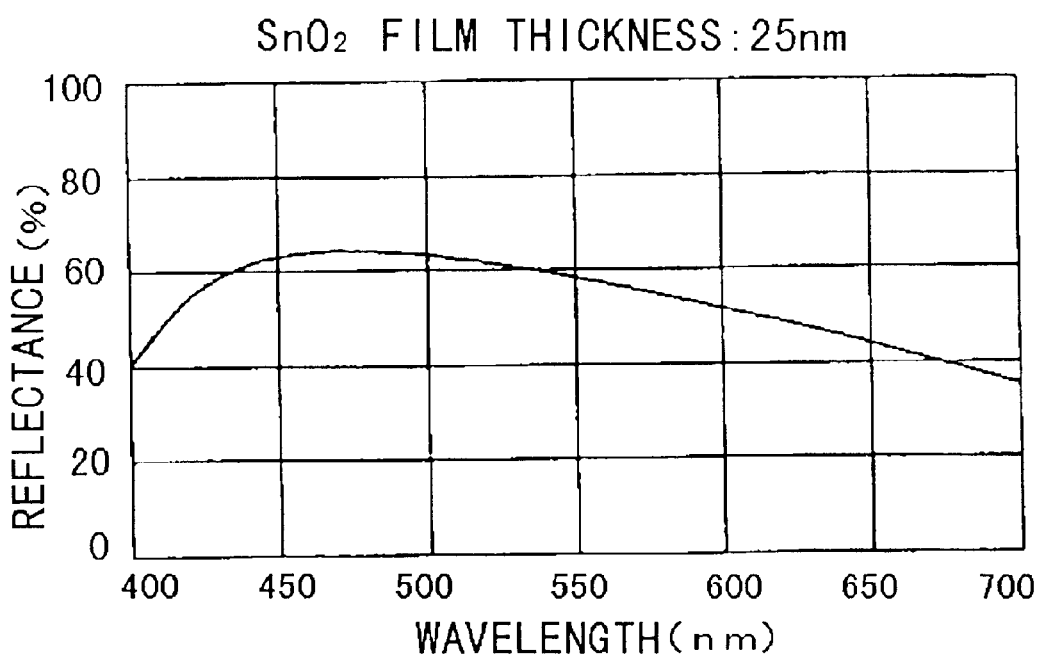
FIG. 11 is a graph showing reflectance in a case where $SnO_2$ is employed as the reflectance adjusting layer of the embodiment of FIG. 8.

FIG. 11 shows reflectance in case $SnO_2$ having a film thickness of 25 nm is used as the reflectance adjusting layer 20. According to this reflectance adjusting layer, reflectance as a whole is increased as compared with FIG. 3.

Figure 12:
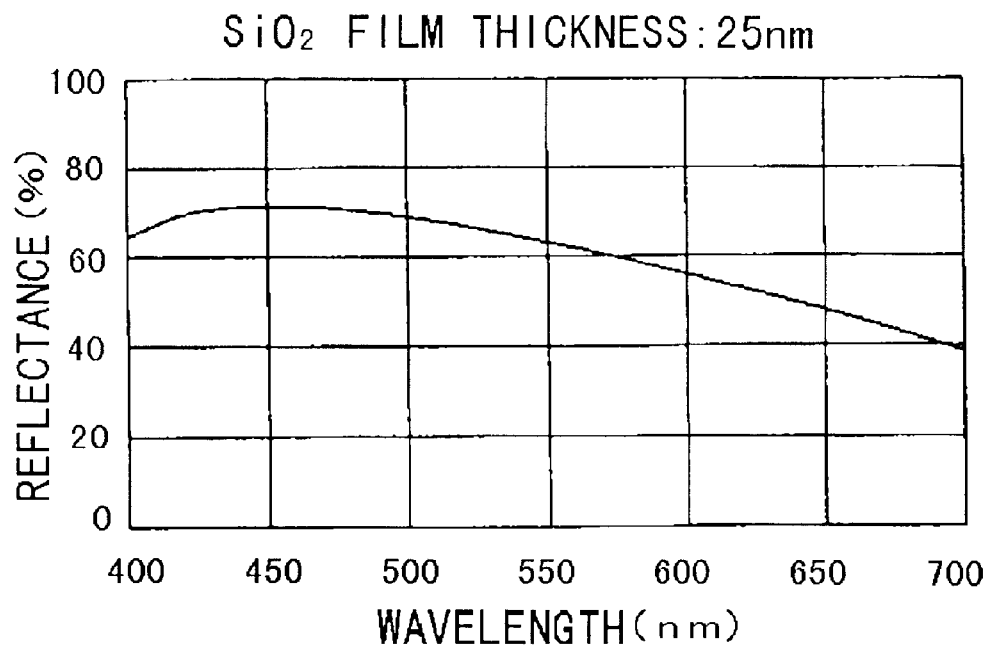
FIG. 12 is graph showing reflectance in a case where $SiO_2$ is employed as the reflectance adjusting layer of the embodiment of FIG. 8.

FIG. 12 shows reflectance in case $SiO_2$ having a film thickness of 25 nm is used as the reflectance adjusting layer 20. According to this reflectance adjusting layer, reflectance as a whole is increased as compared with FIG. 3.

Figure 13:
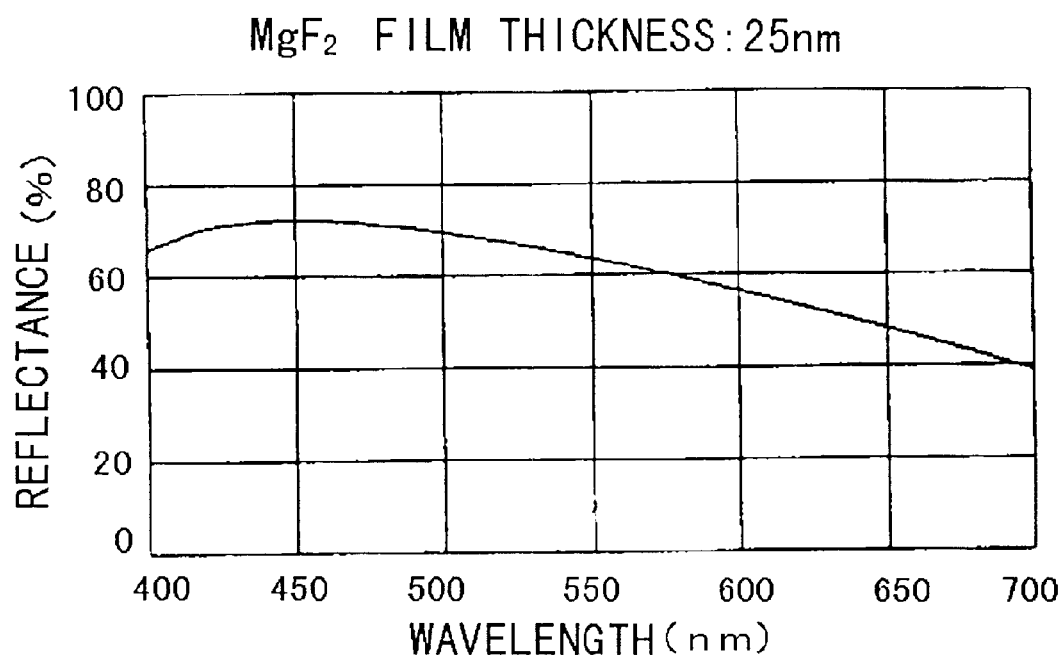
FIG. 13 is a graph showing reflectance in a case where $MgF_2$ is employed as the reflectance adjusting layer of the embodiment of FIG. 8.

FIG. 13 shows reflectance in case $MgF_2$ having a film thickness of 25 nm is used as the reflectance adjusting layer 20. According to this reflectance adjusting layer, reflectance as a whole is increased as compared with FIG. 3.

Table 3 shows results of adherence and durability test of the reflectance adjusting layer 20 formed on the substrate 2. The test was conducted by boiling samples of mirror in 5% salt water for five hours and observing coming off of the reflectance adjusting layer 20.

TABLE 3

| Reflectance adjusting layer | Result of durability test |
|---|---|
| $Al_2O_3$ | no coming off observed |
| $ZrO_2$ | ↑ |
| $SnO_2$ | ↑ |
| $SiO_2$ | partial coming off observed |
| $MgF_2$ | entire coming off observed |

It is seen from the results of the test that no coming off of the reflectance adjusting film 20 was observed with respect to $Al_2O_3$, $ZrO_2$ and $SnO_2$. A partial coming off of the layer 20 was observed on $SiO_2$. The entire layer 20 came off with respect to $MgF_2$. It will be understood from these results that $Al_2O_3$, $ZrO_2$ $_{and\ SnO2}$ are suitable for an exterior rear view mirror for an automobile.

Embodiment 3

Figure 14:
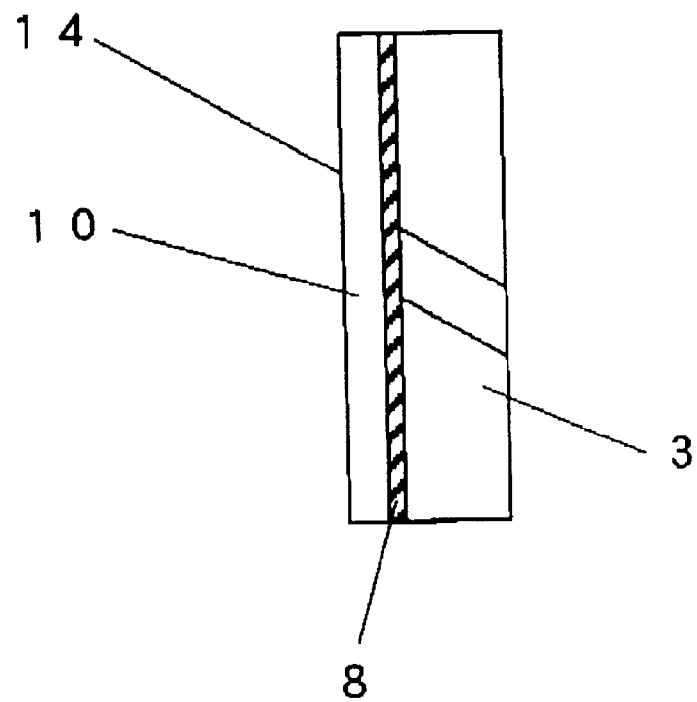
FIG. 14 is a sectional view showing Embodiment 3 of the invention.

FIG. 14 is a sectional view showing Embodiment 3 of the colored anti-fog mirror made according to the invention. On the front surface of a substrate 3 is provided a Cr reflecting film 8. On the front surface of the Cr reflecting film 8 is provided, by, e.g., vapor deposition, a $TiO_2$ film 10 consisting of transparent photocatalytic $TiO_2$ (the hydrophilic function layer comprising photocatalytic substance, the layer comprising photocatalytic substance having a hydrophilic property) in the thickness of 80 nm.

Figure 15:
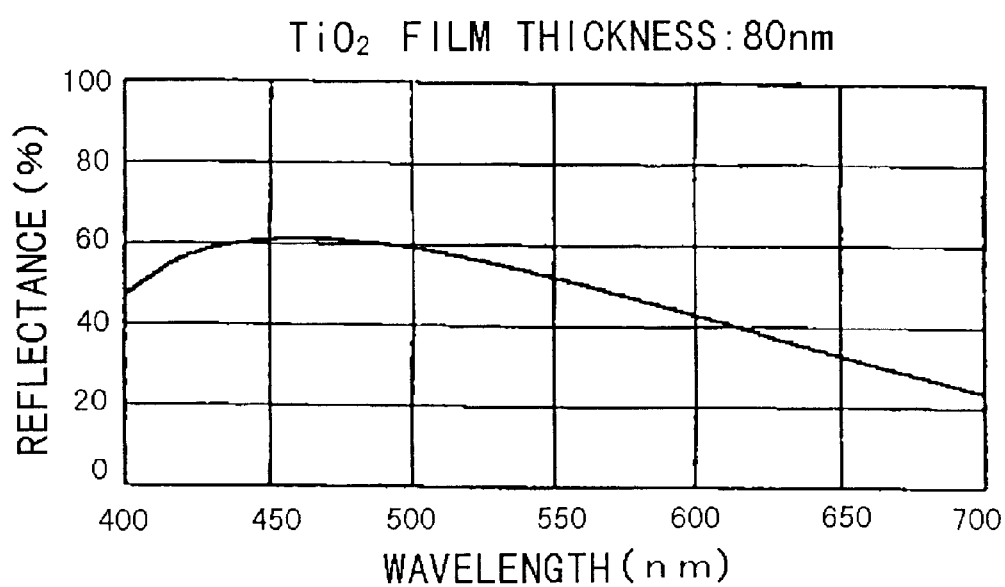
FIG. 15 a graph showing reflectance of the embodiment of FIG. 14.

Reflectance in case the thickness of the $TiO_2$ film 10 is set at 80 nm is shown in FIG. 15. According to this figure, the peak of reflectance appears in the vicinity of 450 nm. The mirror surface 14 therefore appears blue and prevents the glare of the sun light during the day and provides excellent visibility during the night. Owing to the hydrophilic property of $TiO_2$ itself, waterdrops deposited on the mirror surface are spread to a thin film whereby the anti-fog property is provided. Since the distance between the Cr reflecting film 8 and the mirror surface 14 which causes double images is so short that occurrence of double images which can be recognized by the human eyes can be prevented. The $TiO_2$ film performs both the interference by light and the hydrophilic function and, therefore, the process of manufacturing can be simplified and the manufacturing cost can be reduced. Moreover, since the number of films is small, variation in the tone color due to irregularity in the film thickness is small whereby a product having a stable tone color can be easily obtained.

Embodiment 4

Figure 16:
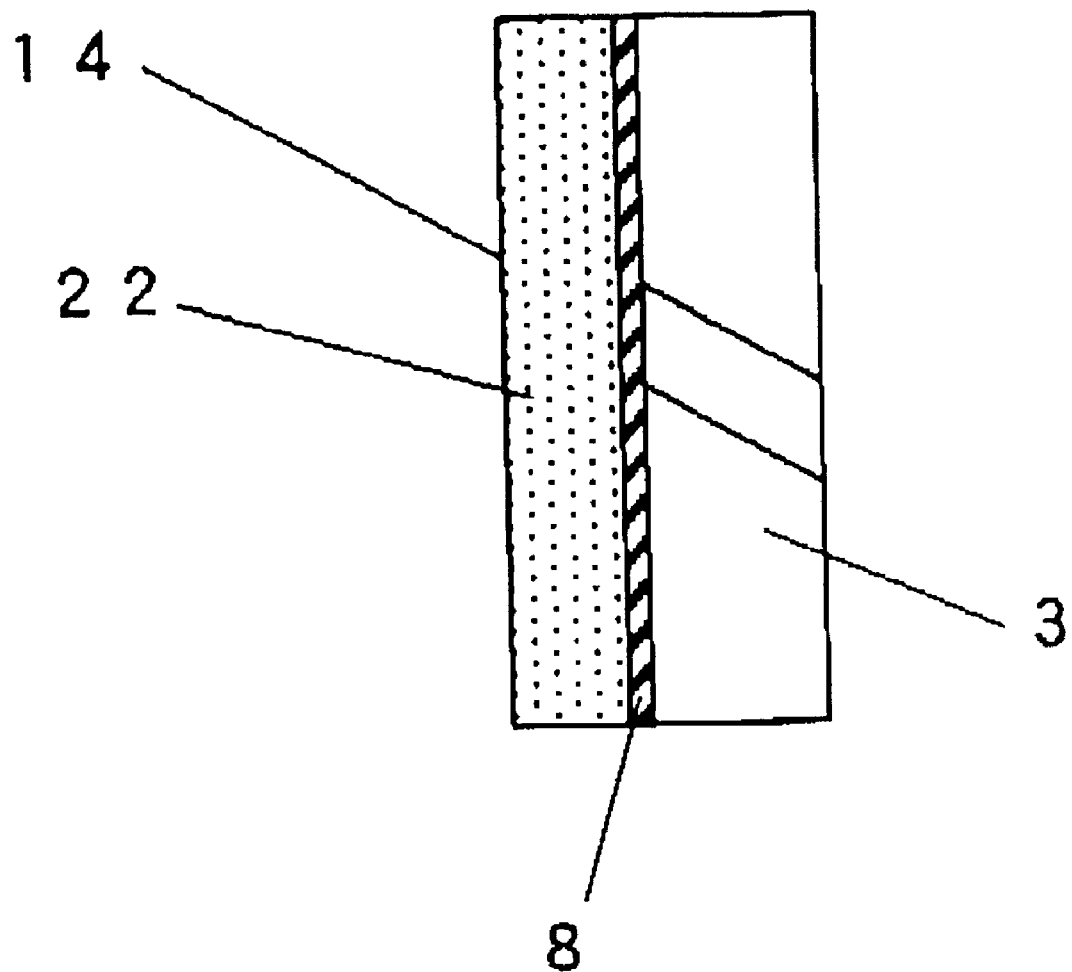
FIG. 16 is a sectional view showing Embodiment 4 of the invention.

FIG. 16 is a sectional view showing Embodiment 4 of the colored anti-fog mirror made according to the invention. On the front surface of a substrate 3 is provided a Cr reflecting film 8. On the front surface of the Cr reflecting film 8 is provided, by, e.g., vapor deposition, a mixture layer 22 consisting of a mixture of $TiO_2$ which is photocatalytic substance and $SiO_2$ which is a hydrophilic inorganic oxide.

According to this arrangement, the peak of reflectance appears in the vicinity of 450 nm. The mirror surface 14 therefore appears blue and prevents the glare of the sun light during the day and provides excellent visibility during the night. Owing to the hydrophilic property of the mixture of $TiO_2$ and $SiO_2$, waterdrops deposited on the mirror surface are spread to a thin film whereby the anti-fog property is provided. Since the distance between the Cr reflecting film 8 and the mirror surface 14 which causes double images is so short that occurrence of double images which can be recognized by the human eyes can be prevented. The mixture layer performs both the interference by light and the hydrophilic function and, therefore, the process of manufacturing can be simplified and the manufacturing cost can be reduced. Moreover, since the number of films is small, variation in the tone color due to irregularity in the film thickness is small whereby a product having a stable tone color can be easily obtained.

In the above described embodiments, Cr is used as the metal reflecting film. The material of the metal reflecting layer is not limited to Cr but other suitable metal such as Al may be used.

What is claimed is:

1. A colored anti-fog mirror comprising:

a substrate;

a metal reflecting film formed on a front surface of the substrate; and a hydrophilic functional layer having a hydrophilic function and comprising a photocatalytic substance provided on the metal reflecting film, the thickness of the hydrophilic functional layer being set in such a manner that the wavelength of reflected light has a top peak of reflectance within a range of from 400 nm to 510 nm, a reflectance has a single top peak in the visible light region and no bottom peak in the visible light region and a mirror surface thereby exhibits a bluish color by interference between the metal reflecting film and the hydrophilic functional layer.

2. A colored anti-fog mirror as defined in claim 1 wherein the hydrophilic function layer is made of a laminate of a photocatalytic layer comprising a photocatalytic substance and a hydrophilic layer comprising a hydrophilic substance provided on the photocatalytic layer.

3. A colored anti-fog mirror as defined in claim 2 further comprising a reflectance adjusting layer which is made of substance having a lower refractive index than the photocatalytic layer and is provided between the metal reflecting film and the photocatalytic layer.

4. A colored anti-fog mirror as defined in claim 3 wherein the metal reflecting film is made of Cr and the reflectance adjusting layer is made of $Al_2O_3$, $ZrO_2$ or $SnO_2$.

5. A colored anti-fog mirror as defined in claim 2 wherein the thickness of the hydrophilic layer is within a range from 10 nm to 50 nm.

6. A colored anti-fog mirror as defined in claim 2 wherein the hydrophilic substance is $SiO_2$.

7. A colored anti-fog mirror as defined in claim 1 wherein the [hydrophilic function layer is made of a] layer comprising a photocatalytic substance having hydrophilic properties.

8. A colored anti-fog mirror as defined in claim 7 further comprising reflectance adjusting layer which is made of substance having a lower refractive index than the layer comprising the photocatalytic substance having hydrophilic properties and is provided between the metal reflecting film and the layer comprising the photocatalytic substance having hydrophilic properties.

9. A colored anti-fog mirror as defined in claim 8 wherein the metal reflecting film is made of Cr and the reflectance adjusting layer is made of $Al_2O_3$, $ZrO_2$ or $SnO_2$.

10. A colored anti-fog mirror as defined in claim 1 wherein the hydrophilic function layer is made of a layer comprising a mixture of photocatalytic substance and hydrophilic substance.

11. A colored anti-fog mirror as defined in claim 10 further comprising a reflectance adjusting layer which is made of substance having a lower refractive index than the layer comprising a mixture of photocatalytic substance and hydrophilic substance and is provided between the metal reflecting film and the layer comprising a mixture of photocatalytic substance and hydrophilic substance.

12. A colored anti-fog mirror as defined in claim 11 wherein the metal reflecting film is made of Cr and the reflectance adjusting layer is made of $Al_2O_3$, $ZrO_2$ or $SnO_2$.

13. A colored anti-fog mirror as defined in claim 1 wherein the photocatalytic substance is $TiO_2$.

14. A colored anti-fog mirror as defined in claim 1 wherein the surface of the hydrophilic function layer is made porous.

15. A colored anti-fog mirror comprising:

a substrate;

a metal reflecting film formed on a front surface of the substrate; and a hydrophilic functional layer which consists essentially of $TiO_2$, the thickness of the hydrophilic functional layer being set in such a manner that the wavelength of reflected light has a top peak of reflectance within a range of from 400 nm to 510 nm, a reflectance has a single top peak in the visible light region and no bottom peak in the visible light region and a mirror surface thereby exhibits a bluish color by interference between the metal reflecting film and the hydrophilic functional layer.

* * * * *